United States Patent [19]

Okawa et al.

[11] Patent Number: 5,776,023
[45] Date of Patent: Jul. 7, 1998

[54] HEAVY-DUTY POWER TRANSMISSION V-BELT

[75] Inventors: Hirokazu Okawa; Hidetake Iwasaki; Mitsuhiko Takahashi; Hidekazu Maruyama; Hiroyuki Sakanaka; Sakae Umeda, all of Kobe, Japan

[73] Assignee: Bando Chemical Industries, Ltd., Kobe, Japan

[21] Appl. No.: 679,518

[22] Filed: Jul. 12, 1996

[30] Foreign Application Priority Data

Jul. 13, 1995 [JP] Japan ................................ 7-176963

[51] Int. Cl.$^6$ ................................................ F16G 1/22
[52] U.S. Cl. ................................ 474/243; 474/244
[58] Field of Search ........................ 474/243, 244, 474/240, 242

[56] References Cited

U.S. PATENT DOCUMENTS

| | | | |
|---|---|---|---|
| 4,655,732 | 4/1987 | Takashima | 474/242 X |
| 4,734,085 | 3/1988 | Takashima et al. | 474/242 |
| 4,813,920 | 3/1989 | Inukai et al. | 474/242 X |
| 4,894,048 | 1/1990 | Inukai et al. | 474/242 X |

FOREIGN PATENT DOCUMENTS

| | | |
|---|---|---|
| 0135710 | 4/1985 | European Pat. Off. . |
| 0213627 | 3/1987 | European Pat. Off. . |

*Primary Examiner*—Roger J. Schoeppel
*Attorney, Agent, or Firm*—Sixbey Friedman Leedom & Ferguson; Gerald J. Ferguson, Jr.; Thomas W. Cole

[57] ABSTRACT

A heavy-duty power transmission V-belt is so designed that respective upward projections each having an arcuate cross section of respective blocks are fixedly engaged with respective bottom-surface grooves each having an arcuate cross section of a tension member. The radius of curvature R2 of each bottom-surface groove is set larger than the radius of curvature R1 of the upward projection of the block (R2>R1) in the state that the tension member is put strait. Thereby, when the V-belt bends around a pulley, it can be avoided that a large local strain occurs at the bottom-surface groove. This allows a firmly fixed state of each block by the tension member to be maintained for a long time.

3 Claims, 8 Drawing Sheets

DISTRIBUTION OF
INITIAL STRAINS

DISTRIBUTION OF
POST-RUNNING STRAINS

DISTRIBUTION OF INITIAL STRAINS

DISTRIBUTION OF POST-RUNNING STRAINS

HEAVY-DUTY POWER TRANSMISSION V-BELT

BACKGROUND OF THE INVENTION

This invention relates to a heavy-duty power transmission V-belt used in a belt power transmission device for car, for agricultural general-purpose implements such as a combine and a tractor, and for general-purpose industrial machine, and in particular relates to a fixing structure of a block by a tension member.

Recently, as transmissions for agricultural implements such as a combine and a tractor and for car, belt-type stepless transmissions have been developed for the purpose of improvements in operability of gear change and improvements in specific fuel consumption. A heavy-duty power transmission V-belt used for such kinds of transmissions is generally so composed that a multitude of blocks are fixedly engaged with a single or plurality of endless tension members at specific intervals in a belt length direction and the belt is designed so as to resist at both side surfaces thereof high sideways pressure from pulleys when the belt is wound around the pulleys.

Detailed description is made about the above-mentioned V-belt. As shown in FIGS. 12 and 13, top-surface grooves 6 which each have an approximately rectangular cross section and extend in a belt width direction are provided on the top surface side of the tension member 1 at specific intervals in a belt length direction (lateral direction in the figures), while corresponding bottom-surface grooves 7 which each have an arcuate cross section and extend in the belt width direction are provided on the bottom surface side of the tension member 1 at specific intervals in the belt length direction (lateral direction in the figures). Each block 8 is provided with a slit-like fitting part 10 which extends in the belt width direction and penetrates in the belt length direction. The upper end of the fitting part 10 has a downward projection 11 with an approximately rectangular cross section, while the lower end of the fitting part 10 has an upward projection 12 with an arcuate cross section. The downward projection 11 of the block 8 is fit into the top-surface groove 6 of the tension member 1, while the upward projection 12 is fit into the bottom-surface groove 7. Thereby, each block 8 is fixedly engaged with the tension member 1.

Under the above structure, when the V-belt is wound around the pulleys, it can transmit heavy-duty power in a way to fix the blocks 8 by the tension member 1 so as to prevent the blocks 8 from swinging at the surface orthogonal to the belt width direction. At the time, the fixing of the block 8 by the tension member 1 is mainly made in the bottom-surface groove 7. In other words, the bottom-surface groove 7 elastically deforms the upward projection 12 of the block 8 so as to catch it therein in the belt length direction thereby holding it with pressure.

If the fixing of the block 8 by the tension member 1 is not sufficient, the block 8 may be swung. In such a case, a crack may occur in the bottom-surface groove 7 of the tension member 1, resulting from deterioration of material due to wear and friction heat. Such a crack induces breakage of the tension member 1. Further, the instability in position of the block 8 due to swinging causes fatigue failure of the block 8 at an early stage. As a result, the belt life may be shortened.

To sufficiently fix the blocks 8 by the tension member 1, there is known a conventional technique (Japanese Patent No. 1570679) that as shown in FIG. 12, the radius of curvature R1 of the upward projection 12 of the block 8 is set larger than the radius of curvature R2 of the bottom-surface groove 7 of the tension member 1 (R1>R2). According to this technique, both ends 7a, 7a in the belt length direction of the bottom-surface groove 7 can catch the upward projection 12 therein thereby increasing a fixing force to the block 8.

In the above conventional technique, however, when the V-belt is wound around the pulley, both the ends 7a, 7a in the belt length direction of the bottom-surface groove 7 produces significantly large local strains, as schematically shown on the left side of FIG. 13 that illustrates a distribution of initial strains in the bottom-surface groove 7. The portion having such a local strain produces large wear and heat. This may cause breakage of the tension member 1 at an early stage due to deterioration of material.

Further, as shown on the right side of FIG. 13, when the bottom-surface groove 7 gradually deforms with time so as to make the strains uniform so that the radius of curvature of the groove 7 becomes large, the tension member 1 may be decreased in elasticity so that it cannot firmly fix the block 8. This causes early breakage of the tension member 1 and early failure of the block 8, thereby reducing the belt life.

An object of the present invention is to prevent a large local strain from occurring in the bottom-surface groove of the tension member when the belt is wound around the pulley thereby maintaining the firmly fixed state of the block by the tension member for a long time while restricting the bottom-surface groove from deforming with time, by improving the relationship between the radius of curvature of the bottom-surface groove and the radius of curvature of the upward projection when the upward projection of each block is fixedly engaged with the bottom-surface groove of the tension member.

SUMMARY OF THE INVENTION

To attain the above object, in the present invention, the radius of curvature of a bottom-surface groove is set, contrary to the conventional technique, larger than the radius of curvature of an upward projection and the pressing force of the bottom-surface groove against the upward projection is uniformized in a belt length direction. Thereby, it can be avoided that a large local strain occurs in the bottom-surface groove.

More specifically, a heavy-duty power transmission V-belt of the present invention is used in a way to be wound between set pulleys and comprises: at least one endless tension member; and a multitude of blocks fixedly engaged with the tension member at specific intervals in a belt length direction. The tension member is provided at the bottom surface side thereof with bottom-surface grooves at specific intervals in the belt length direction. The bottom-surface grooves each have an approximately arcuate cross section and extend in a belt width direction. The blocks are each provided at a portion corresponding to the bottom surface of the tension member with upward projections which each have an approximately arcuate cross section. The upward projections are each engaged with the bottom-surface groove to fixedly secure the block.

Further, in the V-belt, the radius of curvature of the arcuate portion of the bottom-surface groove is set larger than the radius of curvature of the arcuate portion of the upward projection in a state that the tension member is put strait.

Under the above structure, when the heavy-duty power transmission V-belt, which runs in a state that it is wound between the pulleys, bends around the pulley, the bottom-surface groove of the tension member elastically deforms in a direction that the radius of curvature of the arcuate portion becomes small to catch the upward projection of the block in the belt length direction. At the time, though the arcuate portion of the bottom-surface groove tries to elastically deform into the radius of curvature smaller than that of the arcuate portion of the upward projection, it causes a strain since the deformation is constrained by the surface of the upward projection. At this time, since the original radius of curvature of the bottom-surface groove is lager than that of the upward projection, the pressing force of both ends in the belt length direction of the bottom-surface groove against both ends in the belt length direction of the upward projection becomes smaller as compared with the conventional technique. Accordingly, strains which occur at both the ends of the bottom-surface groove can be restricted small. This prevents the bottom-surface groove from deforming with time so that the firmly fixed state of the blocks by the tension member can be maintained for a long time.

It is preferable that the radius of curvature of the bottom-surface groove is set to be approximately equal to the radius of curvature of the upward projection when the belt bends around a pulley with a minimum diameter among a plurality of pulleys having different pulley diameters. Thereby, when the V-belt is wound around the pulley with a minimum diameter, the radius of curvature of the bottom-surface groove becomes approximately equal to that of the upward projection. Accordingly, when the belt is used so as to be wound between set pulleys, a larger strain does not occur as compared with the case that the bottom-surface groove of the running V-belt contacts the pulley with a minimum diameter. It can be efficiently avoided that inconveniences occur due to such a strain.

Further, both the ends in the belt length direction of at least one of the bottom-surface groove and the upward projection may be so formed that the pressing force of both the ends of the bottom-surface groove against both the ends of the upward projection becomes small when the belt is wound around the pulley. Under this structure, when the V-belt is wound around the pulley so that the radius of curvature of the bottom-surface groove becomes small, both the ends of the bottom-surface groove press both the ends of the upward projection only with a small pressing force. As a result, strains which occur at both the ends of the bottom-surface groove are restricted still smaller.

At the time, both ends in the belt length direction of at least one of the bottom-surface groove and the upward projection may be formed so as to have a linear cross section. This makes the pressing force of the bottom-surface groove against the upward projection small. Thereby, the above-mentioned operations and effects can be obtained in a simple form and structure.

Figure 1:
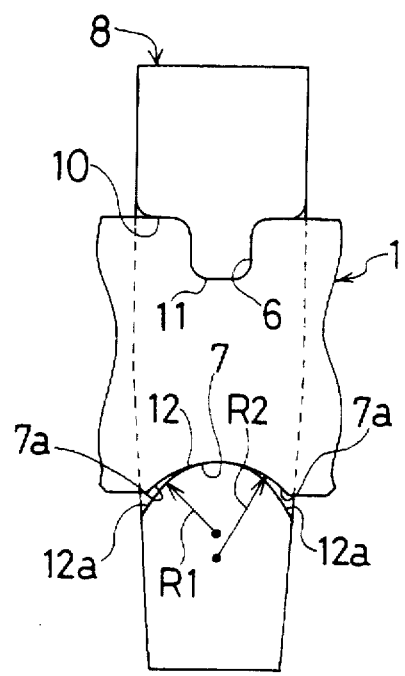
FIG. 1 is a side view showing a necessary portion of a heavy-duty power transmission V-belt according to Embodiment 1 of the present invention.

DESCRIPTION OF THE PREFERRED EMBODIMENTS (Embodiment 1)

FIGS. 3–6 each show the entire structure of a heavy-duty power transmission V-belt according to Embodiment 1 of the present invention. The V-belt is used in a way to be wound between two variable speed pulleys of a belt-type stepless transmission, though it is not shown. The variable speed pulleys are composed of a fixed sheave located on the driving side and a movable sheave located on the driven side. The V-belt is so composed that a multitude of blocks 8, 8, . . . are provided at specific intervals in a belt length direction and are fixedly engaged with a pair of endless tension members 1, 1 located at respective sides.

The tension member 1 is composed of: a form holding layer 2 made of rubber elastic material; and tension cords 3, 3, . . . which are wound in a spiral in the vertically middle point of the form holding layer 2 and are embedded so as to be parallel-arranged at specific intervals in a belt width direction. The top surface of the form holding layer 2 is covered with a top fabric 4, while the bottom surface is covered with a bottom fabric 5.

On the top surface side of each tension member 1, a multitude of top-surface grooves 6, 6, . . . each having a concave cross section are provided at specific intervals in the belt length direction so as to extend in the belt width direction. On the bottom surface side of each tension member 1, a multitude of bottom-surface grooves 7, 7, . . . each having an arcuate cross section, which vertically corresponds to the top-surface grooves 6, 6, . . . , are provided at specific intervals in the belt length direction so as to extend in the belt width direction.

The block 8 has an approximately opposite trapezoidal cross section. Both side surfaces of the block 8 are slide contact parts 9, 9 slidingly contactable with the groove surface of the variable speed pulley. Further, both the side surfaces of the block 8 are provided with respective slit-like fitting parts 10, 10 which penetrate the block 8 in the belt length direction, extend in the belt width direction and are open sideways. The upper end of the fitting part 10 is formed into a downward projection 11 with an opposite convex cross section which projects downward. The downward projection 11 is engaged with the top-surface groove 6 of the tension member 1. On the other hand, the lower end of the fitting part 10 is formed into an upward projection 12 with an arcuate cross section which projects upward. The upward projection 12 is engaged with the bottom-surface groove 7 of the tension member 1.

As one of features of the present invention, as shown in FIG. 1, the radius of curvature R2 of the bottom-surface groove 7 of the tension member 1 is set larger than the radius of curvature R1 of the upward projection 12 of the block 8 (R2>R1) in the state that the tension member 1 is put strait.

Figure 7:
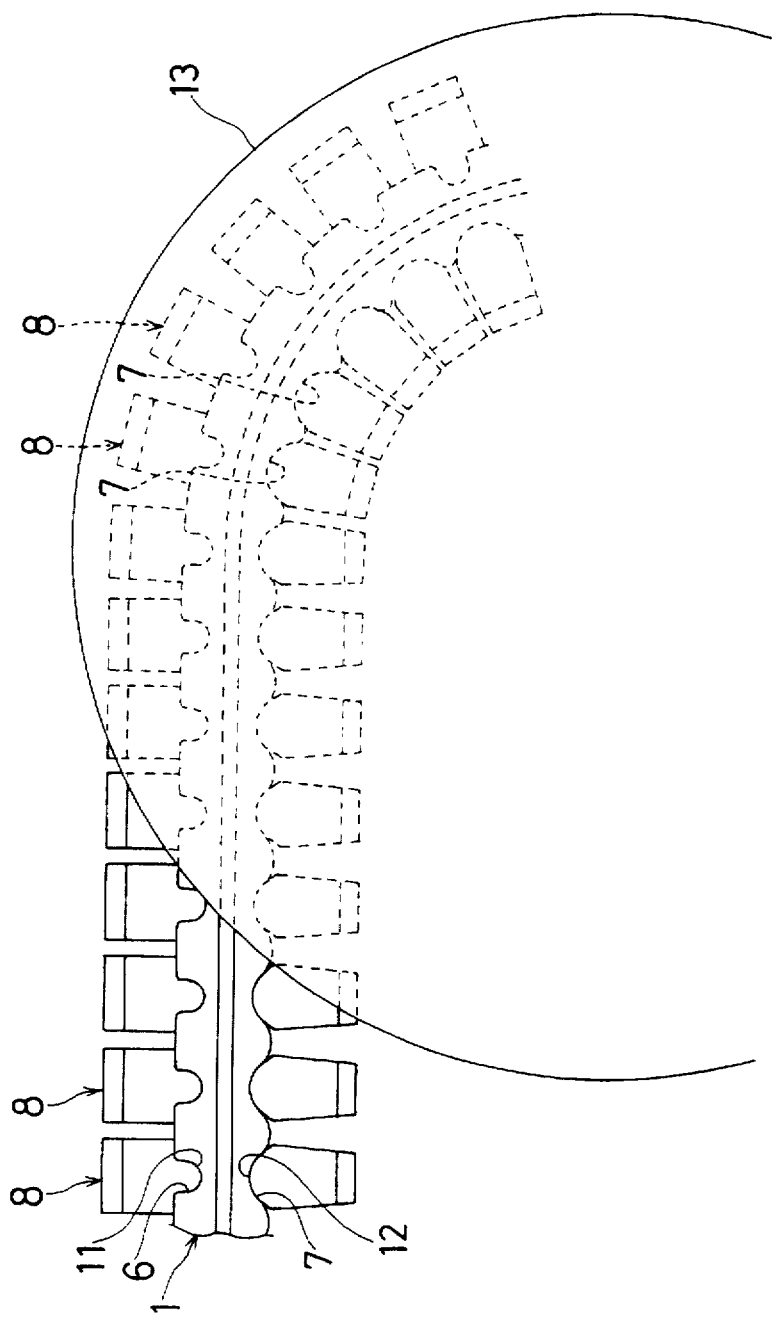
FIG. 7 is a side view partly showing the state that the heavy-duty power transmission V-belt is wound around a pulley.

More specifically, as shown in FIG. 7, the radius of curvature R2 of the bottom-surface groove 7 is set to be approximately equal to the radius of curvature R1 of the upward projection 12 when the belt bends around a pulley with a minimum diameter among plural types of pulleys having different pulley diameters (a variable speed pulley 13 in this embodiment).

According to this embodiment, when the heavy-duty power transmission V-belt runs between the variable speed pulleys and is then wound around the variable speed pulley, the bottom-surface groove 7 of the tension member 1 elastically deforms in a direction of reducing its radius of curvature R2 to catch therein the upward projection 12 of the block 8 in the belt length direction. At this time, since the original radius of curvature R2 of the bottom-surface groove 7 is larger than the radius of curvature R1 of the upward projection 12, the pressing force of both ends 7a, 7a in the belt length direction of the bottom-surface groove 7 against both ends 12a, 12a in the belt length direction of the upward projection 12 becomes smaller as compared with the conventional technique. This restricts strains which occur at both the ends 7a, 7a of the bottom-surface groove 7. Accordingly, wear and heat production at both the ends 7a, 7a of the bottom-surface groove 7 can be restricted thereby preventing deterioration of material due to the wear and heat production. As a result, the tension member 1 can be prevented from breaking at an early stage thereby extending a belt life.

Figure 2:
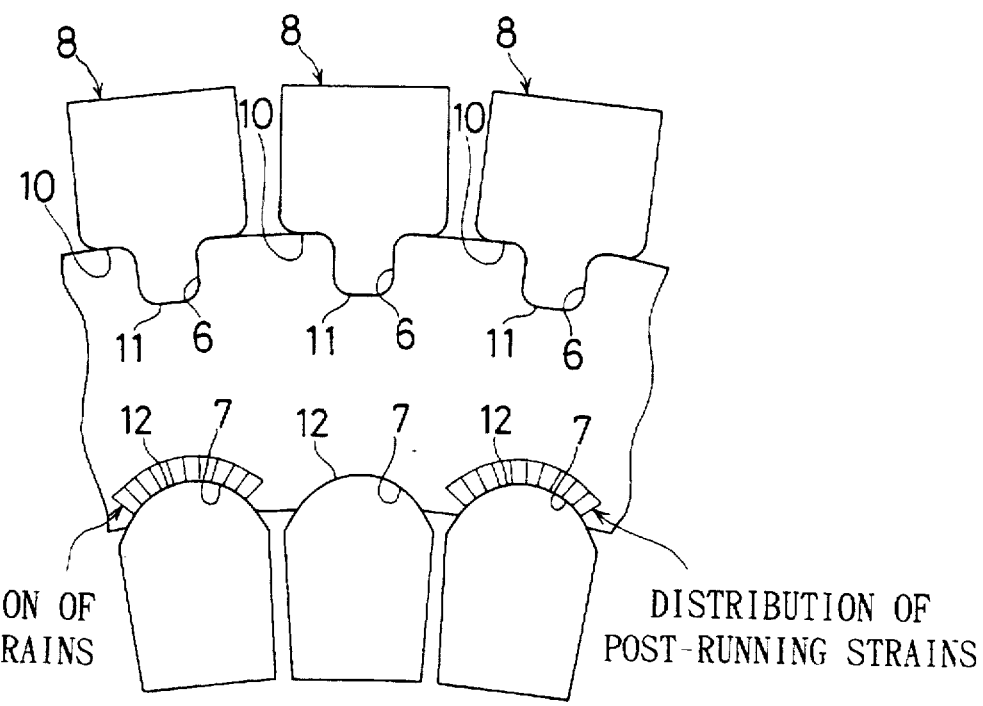
FIG. 2 is a side view showing changes in distribution of strains caused by belt running.
Figure 3:
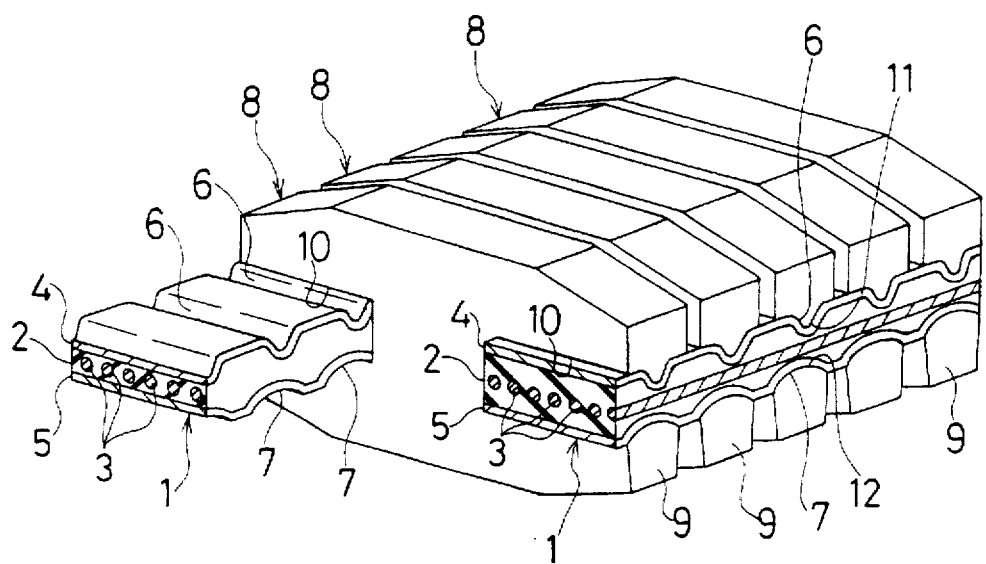
FIG. 3 is a perspective view partly showing the heavy-duty power transmission V-belt.
Figure 4:
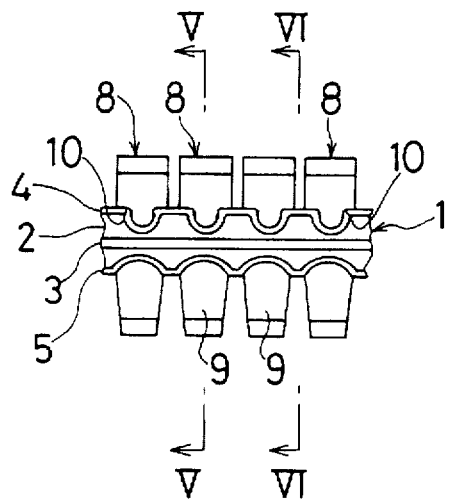
FIG. 4 is a side view partly showing the heavy-duty power transmission V-belt.
Figure 5:
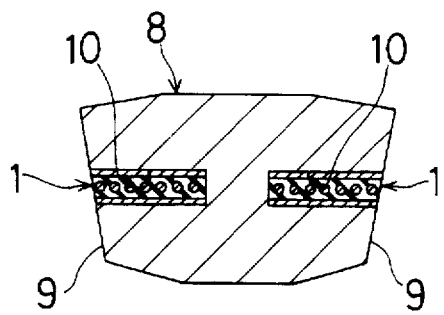
FIG. 5 is a cross section taken on line V—V of FIG. 4.
Figure 6:
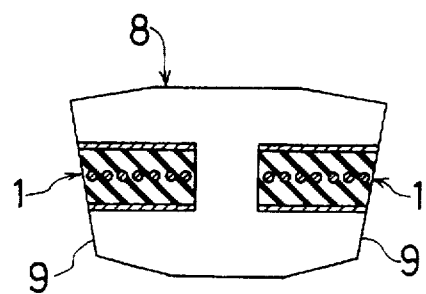
FIG. 6 is a cross section taken on line VI—VI of FIG. 4.

Further, strains of the bottom-surface groove 7 when the V-belt is wound around the minimum-diameter pulley 13 can be uniformly produced in the belt length direction. Therefore, as shown in distributions of initial strains and post-running strains of FIG. 2, the bottom-surface groove 7 is difficult to produce deformation with time. Therefore, drop in fixing strength of the block 8 due to such a strain can be restricted so that the firmly fixed state of the block 8 can be maintained for a long time. Further, it can be avoided that early breakage of the tension member 1 and early fatigue failure of the block 8 occur due to insufficient fixing. This also extends the belt life.

Furthermore, since the radius of curvature R2 of the bottom-surface groove 7 becomes approximately equal to the radius of curvature R1 of the upward projection 12 when the V-belt bends along the minimum-diameter pulley 13, no larger strain than that of this state occurs at the bottom-surface groove 7 of the running V-belt. Thereby, a strain occurring at the bottom-surface groove 7 can be restricted still smaller.

In Embodiment 1, description is made about the case of the belt-type stepless transmission having variable speed pulleys. Alternatively, the present invention is applicable to belt power transmission devices which each have a plurality of V-pulleys whose pulley diameters are fixed.

(Embodiment 2)

Figure 8:
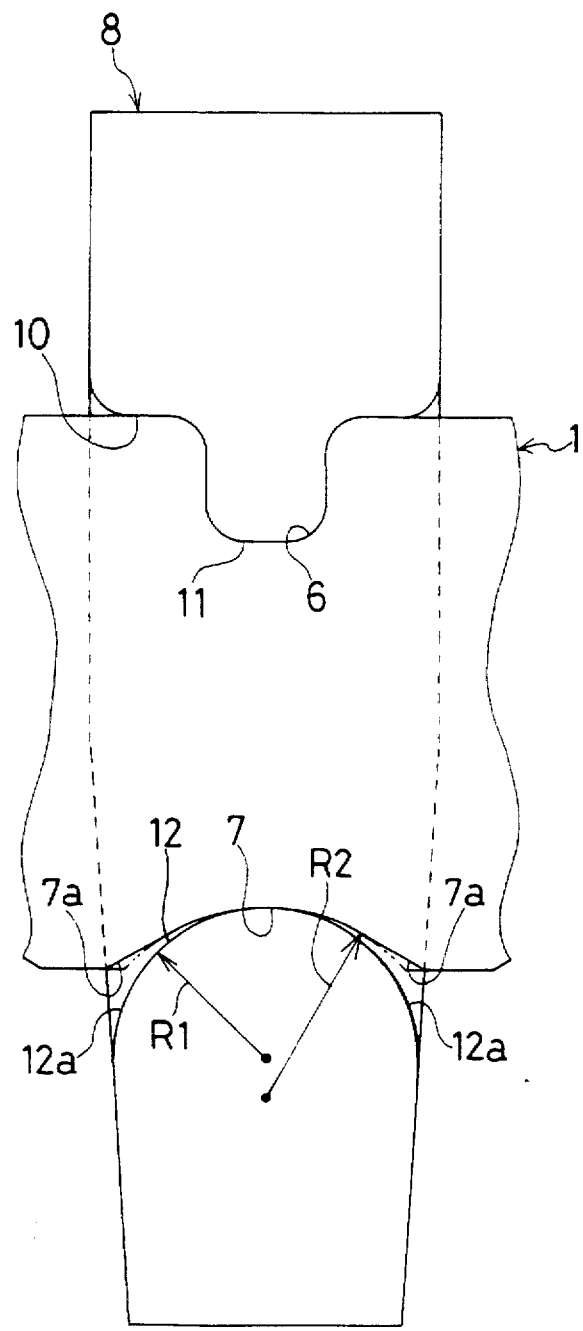
FIG. 8 is an enlarged diagram which shows a necessary portion of a heavy-duty power transmission V-belt according to Embodiment 2 of the present invention and corresponds to FIG. 1.

FIG. 8 shows an enlarged necessary portion of a heavy-duty power transmission V-belt according to Embodiment 2 of the present invention. Since this embodiment has same parts as Embodiment 1 of FIG. 1, in this figure, like parts refer to like reference numerals.

Both ends 7a, 7b in a belt length direction of a bottom-surface groove 7 of a tension member 1 have respective forms that the pressing forces of both the ends 7a, 7a against both ends 12a, 12a in the belt length direction of an upward projection 12 become small.

More specifically, in the bottom-surface groove 7, only the intermediate portion between both the ends 7a, 7a has an approximately arcuate cross section and the radius of curvature R2 of the arcuate portion is set larger than the radius of curvature R1 of the projection 12 (R2>R1), as in Embodiment 1. Further, both the ends 7a, 7a of the bottom-surface groove 7 each have a linear cross section extending in a tangent direction to the intermediate arcuate portion, in contrast to the cross section of the bottom-surface groove 7 of Embodiment 1 as shown in imaginary line of FIG. 8. Accordingly, when the V-belt bends around the variable speed pulley, both the ends 12a, 12a of the upward projection 12 can be freed from the pressing of both the ends 7a, 7a of the bottom-surface groove 7. Since other structure is the same as in Embodiment 1, description is not made.

According to this embodiment, strains which occur at both the ends 7a, 7a of the bottom-surface groove 7 when the V-belt is wound around the variable speed pulley can be reduced as compared with the case of Embodiment 1.

In Embodiment 2, each end 7a of the bottom-surface groove 7 is formed so as to extend from the arcuate portion of the bottom-surface groove 7 in a tangent direction and smoothly continue. However, unless strains of both the ends 7a, 7a of the bottom groove become excessively larger than other portions, the end 7a may be formed into a linear line inclined with respect to the tangent line of the arcuate portion.

(Embodiment 3)

Figure 9:
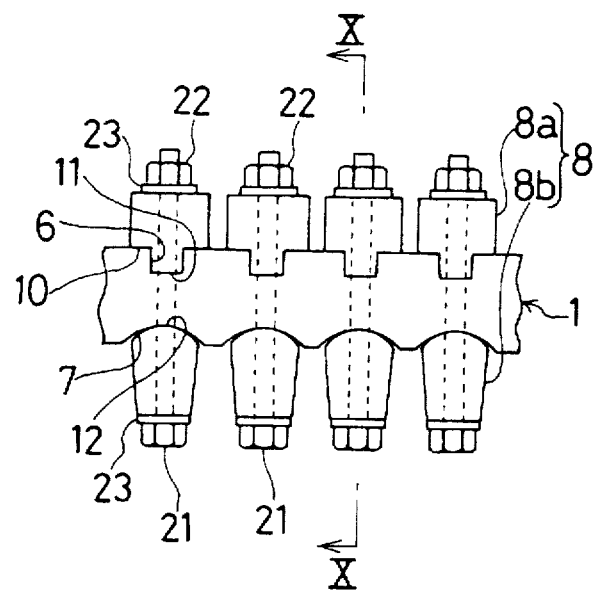
FIG. 9 is a diagram which partly shows a heavy-duty power transmission V-belt according to Embodiment 3 of the present invention and corresponds to FIG. 4.
Figure 10:
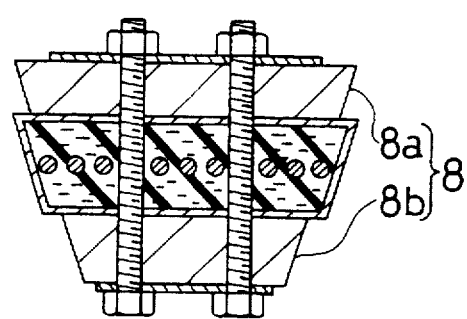
FIG. 10 is a cross section taken on line X—X of FIG. 9.

FIGS. 9 and 10 each show the entire structure of a heavy-duty power transmission V-belt according to Embodiment 3 of the present invention. In contrast to Embodiment 1, the V-belt of this embodiment is so designed that each block 8 is fixedly engaged with a single tension member 1. Since other parts has the same structure as in Embodiment 1, like parts refer to like reference numerals and description is not made.

Each block 8 is so composed that upper-half part 8a and lower-half part 8b which are separate are vertically integrally joined to each other by two pairs of bolts 21, 21 and nuts 22, 22. Between the upper-half part 8a and the lower-half part 8b and between the head of the bolt 21 and the nut 22, spacers 23, 23 like thin boards are interposed respectively. Between the upper-half part 8a and the lower-half part 8b, a fitting part 10 in which the tension member 1 is inserted is formed. A downward projection 11 is provided at the upper end of the fitting part 10, i.e., at the bottom side of the upper-half part 8b, and an upward projection 12 is provided at the lower end of the fitting part 10, i.e., at the top side of the lower-half part 8b. Each bolt 21 is disposed so as to penetrate the lower-half part 8b, the tension member 1 and the upper-half part 8a in order from lower side to upper side.

Figure 11:
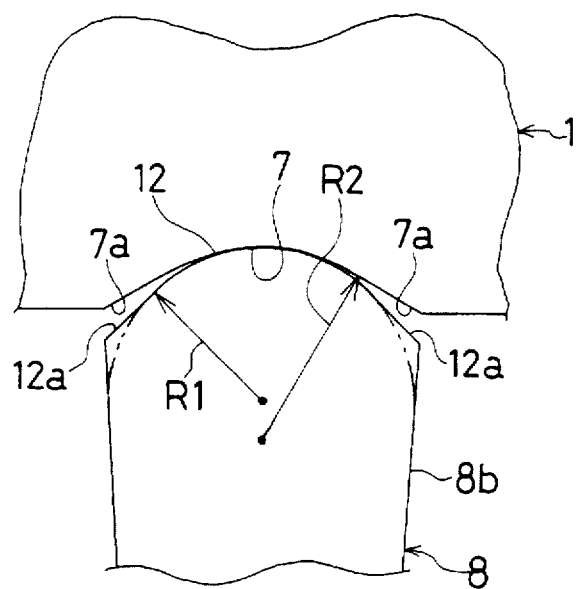
FIG. 11 is an enlarged diagram which shows a necessary portion of the heavy-duty power transmission V-belt and corresponds to FIG. 1.
Figure 12:
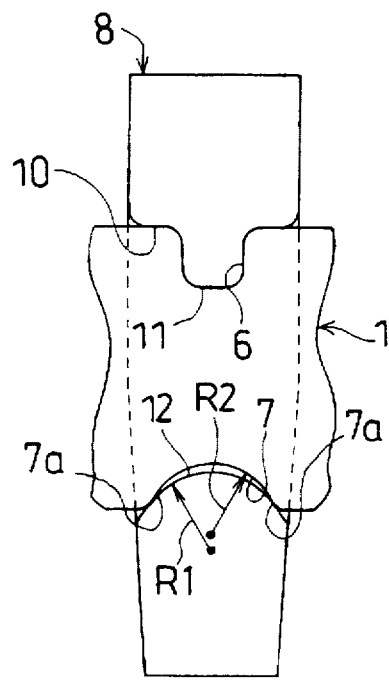
FIG. 12 is a diagram which shows a necessary portion of a conventional heavy-duty power transmission V-belt and corresponds to FIG. 1.
Figure 13:
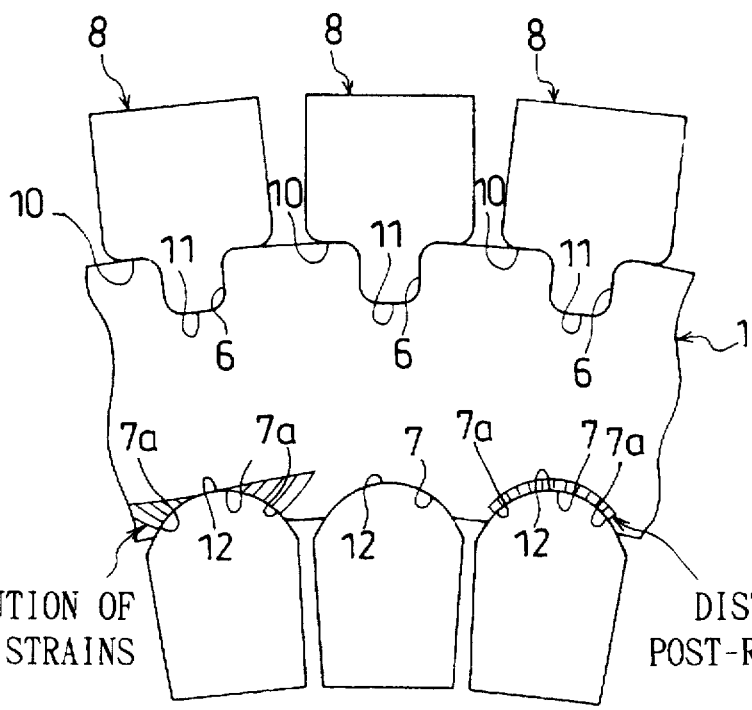
FIG. 13 is a diagram which shows changes in distribution of strains caused by belt running in the conventional technique and corresponds to FIG. 2.

In contrast to Embodiment 2, as enlargedly shown in FIG. 11, the upward projection 12 of the block 8 has an arcuate cross section only at the intermediate portion between both ends 12a, 12a in a belt length direction. Each end 12a has a linear cross section as in both the ends 7a, 7a of the bottom-surface groove 7 of the tension member 1, in contrast to the cross section of the upward projection 12 of Embodiment 2 as shown in imaginary line of FIG. 10.

More specifically, in the intermediate portion of the upward projection 12 and the intermediate portion of the bottom-surface groove 7. the radius of curvature R2 of the bottom-surface groove 7 is set larger than the radius of curvature R1 of the upward projection 12 (R2>R1), as in Embodiments 1 and 2. The intermediate portion of the upward projection 12 is defined to the arcuate length slightly shorter than that of the intermediate portion of the bottom-surface groove 7. The end 7a and the end 12a each continue to the intermediate portion so as to extend in a tangent direction to the arcuate of the intermediate portion.

According to this embodiment, same effects can be performed as in Embodiment 2.

In this Embodiment 3, each end 12a of the upward projection 12 is formed so as to extend from the arcuate portion in a tangent direction and to smoothly continue. However, similar to Embodiment 2, unless strains of both the ends 7a, 7a of the bottom-surface groove 7 become excessively larger than other portions, the end 7a may be formed into a linear line inclined with respect to the tangent line of the arcuate portion.

What is claimed is:

1. A heavy-duty power transmission V-belt adapted to be wound between set pulleys comprising:

at least one endless tension member; and a multitude of blocks fixedly engaged along a width with the tension member at specific intervals in a belt length direction, wherein the tension member is provided at a bottom surface side with bottom-surface grooves at specific intervals in the belt length direction, said bottom-surface grooves each having an approximately arcuate cross section and extend in a belt width direction, the blocks are each provided at a portion corresponding to the bottom surface of the tension member with upward projections, each having an approximately arcuate cross section that extends completely across its width and each being engaged with the bottom-surface groove to fixedly secure the block, and wherein the radius of curvature of the arcuate portion of the bottom-surface groove is set larger than the radius of curvature of the arcuate portion of the upward projection when the tension is straight, and the radius of the curvature of the bottom-surface groove is set to be approximately equal to the radius of curvature of the upward projection when the belt bends around a pulley with a minimum diameter amount a plurality of pulleys having different pulley diameters.

2. A heavy-duty power transmission V-belt according to claim 1, wherein, when the belt is wound around a pulley, a pair of ends in the belt length direction of at least one of the bottom-surface groove and the upward projection so bent that one pair of ends of the bottom-surface groove and the upward projection become more distant from the other pair of ends which are respectively opposed to the pair of the ends, not making continuous curves extended from an arc of an intermediate portion in the belt length direction which excludes the ends, in order to reduce a pressing force of the pair of ends of the upward projection which are respectively opposed to the pair of ends of the bottom-surface groove.

3. A heavy-duty power transmission V-belt according to claim 2, wherein the pair of the ends on the belt length direction of at least one of the bottom-surface groove and the upward projection are so formed as to have plane faces.

* * * * *